US012691619B2

(12) United States Patent
     Okawachi

(10) Patent No.: US 12,691,619 B2
(45) Date of Patent: Jul. 28, 2026

(54) INJECTION MOLDING MACHINE

(71) Applicant: THE JAPAN STEEL WORKS, LTD.,
              Tokyo (JP)

(72) Inventor: Ryo Okawachi, Tokyo (JP)

(73) Assignee: THE JAPAN STEEL WORKS, LTD.,
              Tokyo (JP)

( * ) Notice: Subject to any disclaimer, the term of this
             patent is extended or adjusted under 35
             U.S.C. 154(b) by 191 days.

(21) Appl. No.: 18/375,473

(22) Filed: Sep. 30, 2023

(65) Prior Publication Data

US 2024/0109233 A1      Apr. 4, 2024

(30) Foreign Application Priority Data

Oct. 3, 2022    (JP) ................................ 2022-159621

(51) Int. Cl.
     B29C 45/76          (2006.01)
(52) U.S. Cl.
     CPC ...... B29C 45/7653 (2013.01); B29C 45/7626
            (2013.01); B29C 2945/7602 (2013.01)
(58) Field of Classification Search
     CPC .............. B29C 45/162; B29C 45/1756; B29C
                2945/7602; B29C 45/045; B29C 45/17;
                B29C 45/76; B29C 45/7653; B29C
                                              45/7626
     See application file for complete search history.

(56) References Cited

U.S. PATENT DOCUMENTS

| | | | |
|---|---|---|---|
| 2015/0321406 A1* | 11/2015 | Uchiyama | ............... B29C 45/76 |
| | | | 264/40.1 |
| 2016/0001357 A1 | 1/2016 | Abe et al. | |
| 2018/0123498 A1* | 5/2018 | Tanabe | .................. H02P 29/024 |
| 2024/0308122 A1* | 9/2024 | Hotta | ...................... B29C 45/77 |

FOREIGN PATENT DOCUMENTS

| | | |
|---|---|---|
| CN | 105312534 A | 2/2016 |
| JP | H01-235622 A | 9/1989 |
| JP | H07-205216 A | 8/1995 |
| JP | H10-249901 A | 9/1998 |
| JP | 2000-033472 A | 2/2000 |
| JP | 2000238092 * | 9/2000 |
| JP | 2002-059467 A | 2/2002 |
| JP | 2002-321261 A | 11/2002 |

(Continued)

OTHER PUBLICATIONS

Office Action issued Jun. 2, 2026, in Japanese Patent Application
No. 2022-159621.

*Primary Examiner* — Nahida Sultana
*Assistant Examiner* — Debjani Roy
(74) *Attorney, Agent, or Firm* — Potomac Law Group,
PLLC

(57)                ABSTRACT

An injection molding machine includes a servomotor, a
servo amplifier, and a control device. The servo amplifier
includes a first switching element and a second switching
element. The molding cycle includes a first period in which
the servomotor is rotated and a second period in which the
servomotor is not rotated. The servomotor is configured to
allow motor rotation control, servo-off control, and zero-
speed control to be executed thereon. The control device
executes the motor rotation control in the first period and
executes the servo-off control or the zero-speed control in
the second period.

11 Claims, 12 Drawing Sheets

100

(56) References Cited

FOREIGN PATENT DOCUMENTS

| JP | 2005-144664 A | | 6/2005 |
|----|---------------|---|--------|
| JP | 2015-196291 A | | 11/2015 |
| JP | 2016-013565 A | | 2/2016 |
| JP | 202044836 | * | 3/2020 |
| JP | 2020-069756 A | | 5/2020 |
| JP | 20200069756 | * | 5/2020 |

* cited by examiner

FIG.4

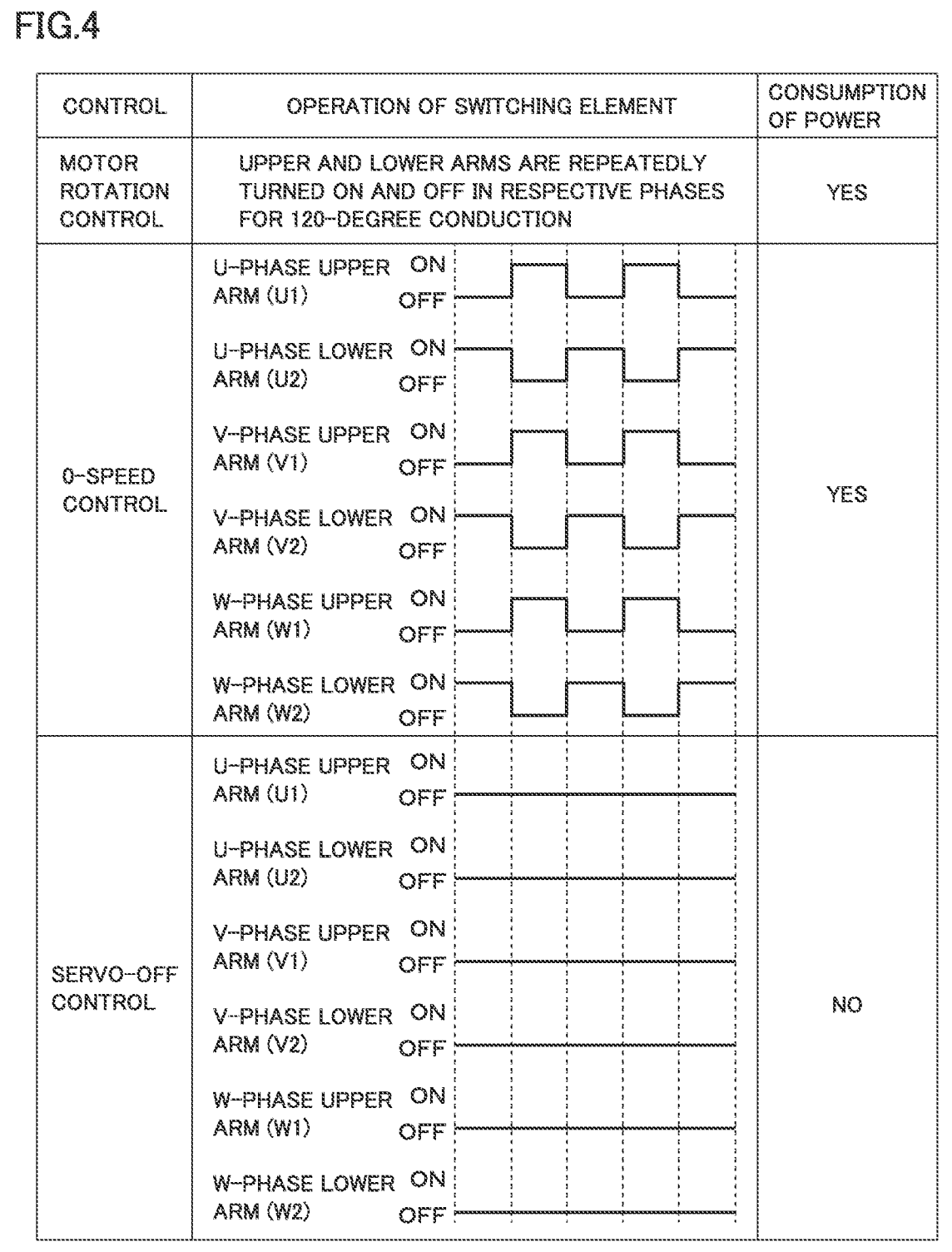

| CONTROL | OPERATION OF SWITCHING ELEMENT | | CONSUMPTION OF POWER |
|---|---|---|---|
| MOTOR ROTATION CONTROL | UPPER AND LOWER ARMS ARE REPEATEDLY TURNED ON AND OFF IN RESPECTIVE PHASES FOR 120-DEGREE CONDUCTION | | YES |
| 0-SPEED CONTROL | U-PHASE UPPER ARM (U1)   ON OFF | | YES |
| | U-PHASE LOWER ARM (U2)   ON OFF | | |
| | V-PHASE UPPER ARM (V1)   ON OFF | | |
| | V-PHASE LOWER ARM (V2)   ON OFF | | |
| | W-PHASE UPPER ARM (W1)   ON OFF | | |
| | W-PHASE LOWER ARM (W2)   ON OFF | | |
| SERVO-OFF CONTROL | U-PHASE UPPER ARM (U1)   ON OFF | | NO |
| | U-PHASE LOWER ARM (U2)   ON OFF | | |
| | V-PHASE UPPER ARM (V1)   ON OFF | | |
| | V-PHASE LOWER ARM (V2)   ON OFF | | |
| | W-PHASE UPPER ARM (W1)   ON OFF | | |
| | W-PHASE LOWER ARM (W2)   ON OFF | | |

[EXAMPLE OF MOLDING CYCLE]

FIG.7
<PROCESSING PROCEDURE OF TEST CYCLE>
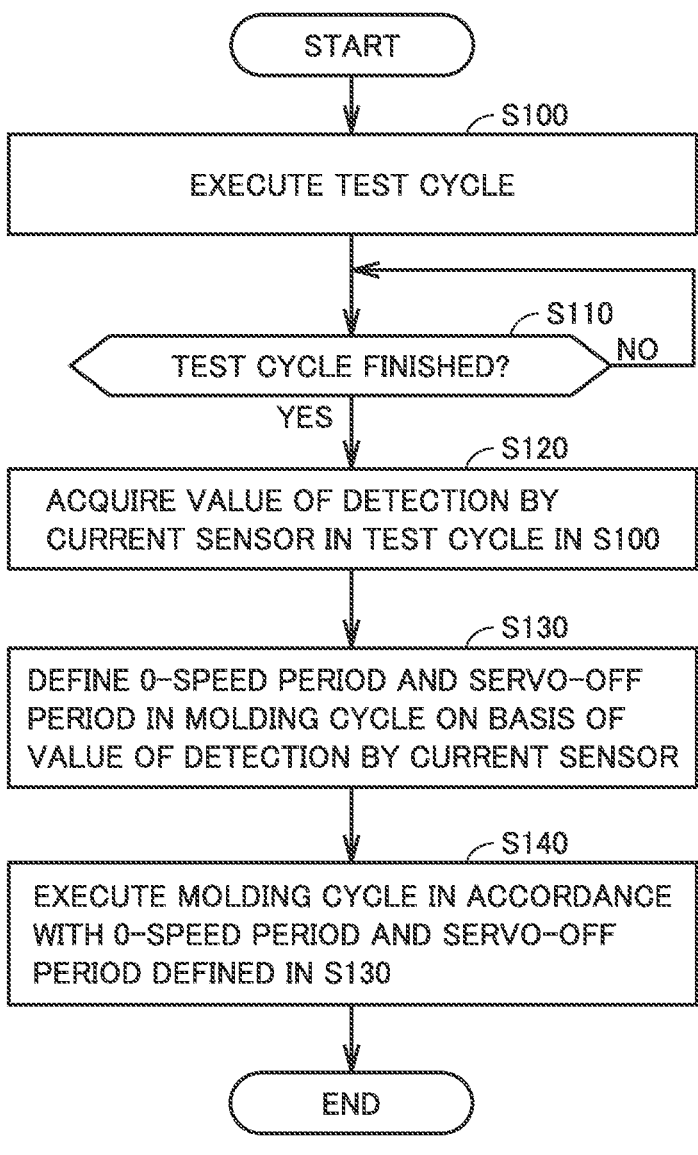

[EXAMPLE OF TEST CYCLE]

100B

<FLOWCHART FOR ONE CYCLE>

FIG.11

<FLOWCHART FOR ONE CYCLE>

FIG.12

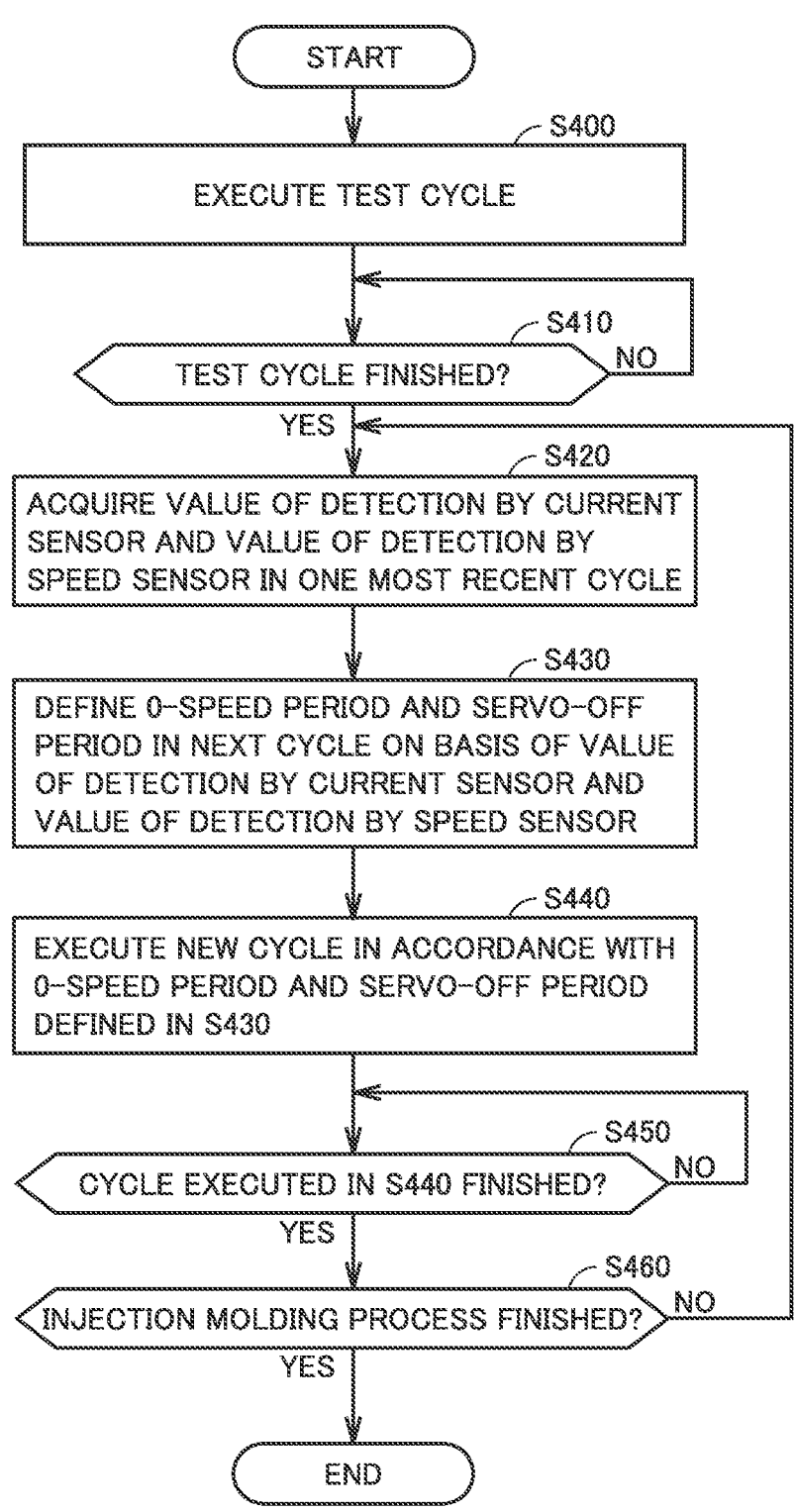

<FLOWCHART OF INJECTION MOLDING PROCESS>

START

S400

EXECUTE TEST CYCLE

S410

TEST CYCLE FINISHED?   NO

YES

S420

ACQUIRE VALUE OF DETECTION BY CURRENT SENSOR AND VALUE OF DETECTION BY SPEED SENSOR IN ONE MOST RECENT CYCLE

S430

DEFINE 0-SPEED PERIOD AND SERVO-OFF PERIOD IN NEXT CYCLE ON BASIS OF VALUE OF DETECTION BY CURRENT SENSOR AND VALUE OF DETECTION BY SPEED SENSOR

S440

EXECUTE NEW CYCLE IN ACCORDANCE WITH 0-SPEED PERIOD AND SERVO-OFF PERIOD DEFINED IN S430

S450

CYCLE EXECUTED IN S440 FINISHED?   NO

YES

S460

INJECTION MOLDING PROCESS FINISHED?   NO

YES

END

INJECTION MOLDING MACHINE

CROSS REFERENCE TO RELATED APPLICATIONS

This nonprovisional application is based on Japanese Patent Application No. 2022-159621 filed on Oct. 3, 2022, with the Japan Patent Office, the entire contents of which are hereby incorporated by reference.

BACKGROUND OF THE INVENTION

Field of the Invention

The present disclosure relates to an injection molding machine.

Description of the Background Art

Factories use injection molding machines to mold molded articles each including a plastic resin or the like as a base material. Japanese Patent Laying-Open No. 2020-069756 describes an electric injection molding machine including a servomotor. Such an injection molding machine repeatedly executes a molding cycle of an injection molding process including a plurality of steps such as an injection step and a pressure keeping step to mass-produce molded articles.

The injection molding machine in Japanese Patent Laying-Open No. 2020-069756 includes a motor for executing a molding cycle. Japanese Patent Laying-Open No. 2020-069756 discloses a circuit diagram of a power supply system that supplies the motor with power. The power supply system in Japanese Patent Laying-Open No. 2020-069756 includes a PWM converter to which a 3-phase alternating-current voltage line is connected, a direct-current voltage line inside the molding machine that is connected to the output side of the PWM converter, and an inverter that is connected to the direct-current voltage line. The inverter generates a 3-phase alternating-current voltage to drive the motor.

SUMMARY OF THE INVENTION

A molding cycle includes a period in which a motor is rotated and a period in which the rotation of the motor is stopped. In the period in which the rotation of the motor is stopped, control may be performed to stop the rotation angle of the motor at a predetermined angle by turning on at least one of switching elements of an inverter. When the motor is stopped by turning on the at least one of the switching elements of the inverter, it is possible to prevent the rotation angle of the motor from unintentionally changing due to the occurrence of external force. Meanwhile, the switching of the switching elements causes the consumption of power.

The present disclosure has been devised to solve such a problem. An object of the present disclosure is to prevent the rotation angle of the motor from unintentionally changing due to the occurrence of the external force in the motor and suppress an increase in the consumption of power.

An injection molding machine according to an embodiment includes a first servomotor; a first servo amplifier that supplies the first servomotor with power; and a control device that controls the first servo amplifier to execute a molding cycle. The first servo amplifier includes a first switching element and a second switching element. The molding cycle includes a first period in which the first servomotor is rotated and a second period in which the first servomotor is not rotated. The first servomotor is configured to be rotatable by being controlled under first control and stoppable by being controlled under second control or third control. The first control is control to rotate the first servomotor by performing control to turn on the first switching element and the second switching element in different phases. The third control is control to stop rotation of the first servomotor by performing control to turn on the first switching element and the second switching element in a same phase. The second control is control to stop the rotation of the first servomotor by performing control to turn off the first switching element and the second switching element. The control device executes the first control in the first period and executes the second control or the third control in the second period.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a diagram for describing an operation of a switching element;

FIG. 7 is a flowchart illustrating a processing procedure for deciding a zero-speed period and a servo-off period;

FIG. 11 is a flowchart illustrating a processing procedure of switching zero-speed control and servo-off control according to a first modification example; and FIG. 12 is a flow illustrating a processing procedure of an injection molding process according to a second modification example.

DESCRIPTION OF THE PREFERRED EMBODIMENTS

Figure 1:
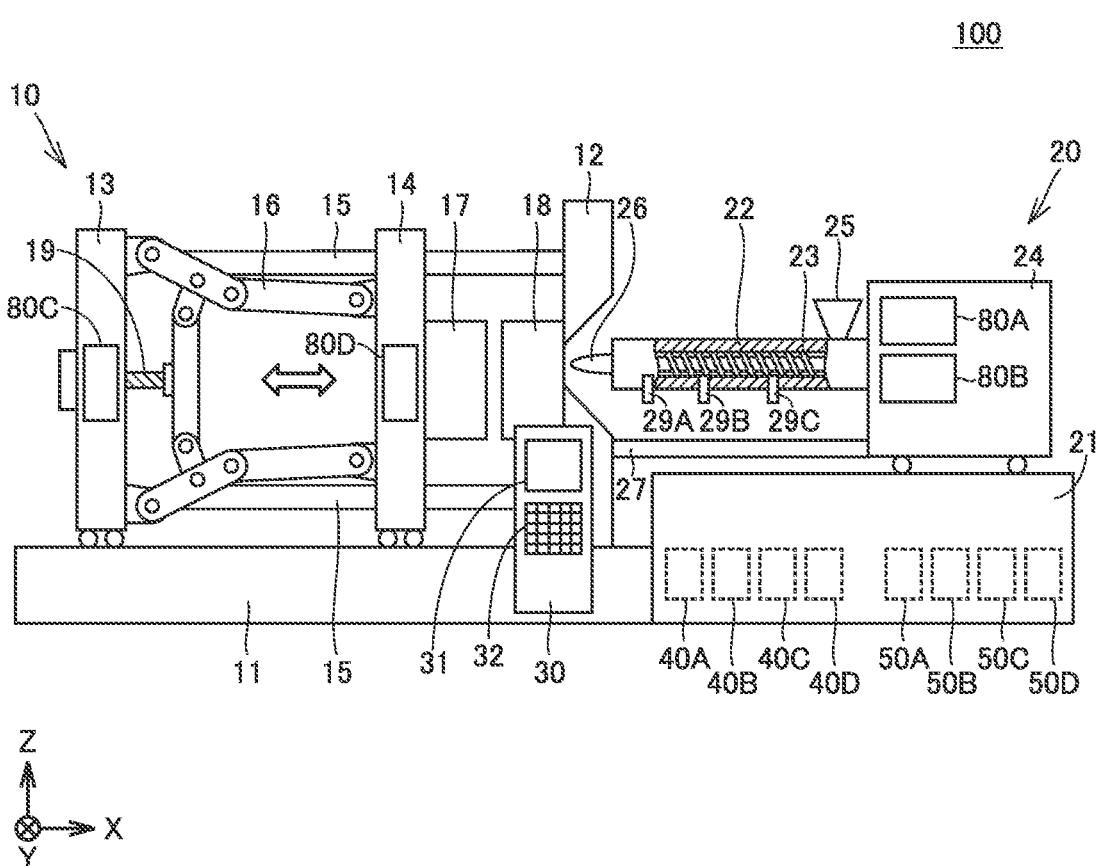
FIG. 1 is an external view of an injection molding machine according to a first embodiment.

With reference to the drawings, the following describes embodiments of the present disclosure in detail. It is to be noted that the same or corresponding portions in the drawings will be denoted by the same reference numerals and will not be repeatedly described.

First Embodiment

<Configuration of Injection Molding Machine>

With reference to FIG. 1, the following describes an injection molding machine 100 according to a first embodiment. FIG. 1 is an external view of injection molding machine 100 according to the first embodiment.

Injection molding machine 100 is placed in an XY plane. The direction vertical to the XY plane will be referred to as a Z-axis direction. The following describes the positive direction of the Z axis in FIG. 1 as an upper surface side or an upper side and the negative direction as a lower surface side or a lower side in some cases. It is to be noted that injection molding machine 100 illustrated in FIG. 1 is illustrated as a horizontal injection molding machine, but injection molding machine 100 according to the first embodiment is not limited to a horizontal injection molding machine. Injection molding machine 100 according to the first embodiment may be a vertical injection molding machine.

An injection molding process that is executed by injection molding machine 100 includes a mold closing step, an injection step, a pressure keeping step, a mold opening step, a cooling step, an ejection step, and a plasticization step. Injection molding machine 100 repeatedly executes a cycle of the injection molding process described above. The following refers to a cycle serving as one unit to mold one molded article as a "molding cycle". Injection molding machine 100 is capable of molding molded articles that vary in shape and material quality. Injection molding machine 100 performs an injection molding process corresponding to the shape and the type of the material quality of a molded article.

Injection molding machine 100 includes a mold clamping device 10, an injection device 20, an operating panel 30, and control devices 40A to 40D. Mold clamping device 10 clamps molds. Injection device 20 melts and injects an injection material. Mold clamping device 10 is disposed on the negative direction side of the X axis with respect to injection device 20.

<Mold Clamping Device>

In the first embodiment, mold clamping device 10 includes a bed 11, a fixed plate 12, a mold clamping housing 13, a movable plate 14, a tie bar 15, a mold clamping mechanism 16, molds 17 and 18, a ball screw 19, and servomotors 80C and 80D. Bed 11 holds fixed plate 12, mold clamping housing 13, movable plate 14, and the like. Fixed plate 12 is fixed at bed 11. Mold clamping housing 13 and movable plate 14 are each configured to be slidable on bed 11 in the X-axis direction.

Tie bar 15 is disposed between fixed plate 12 and mold clamping housing 13. Tie bar 15 couples fixed plate 12 and mold clamping housing 13. Tie bar 15 illustrated in FIG. 1 includes four bars. It is to be noted that the number of bars included in tie bar 15 is not limited to four, but may be, for example, five or more.

Movable plate 14 is configured to be slidable between fixed plate 12 and mold clamping housing 13 in the X-axis direction. Mold clamping mechanism 16 is provided between mold clamping housing 13 and movable plate 14. Mold clamping housing 13 according to the first embodiment includes a toggle mechanism. It is to be noted that mold clamping mechanism 16 may include a straight-hydraulic mold clamping mechanism. The straight-hydraulic mold clamping mechanism precisely means a mold clamping cylinder.

Servomotor 80C is provided in mold clamping housing 13. Servomotor 80C drives mold clamping mechanism 16 through ball screw 19. Ball screw 19 converts rotational motion from servomotor 80C to linear motion to drive mold clamping mechanism 16. Molds 17 and 18 are provided between fixed plate 12 and movable plate 14. Molds 17 and 18 are opened and closed by driven mold clamping mechanism 16.

A step of bringing separated molds 17 and 18 into close contact is referred to as the "mold closing step". In addition, a step of separating molds 17 and 18 that are in close contact is referred to as the "mold opening step". Servomotor 80C is a motor that is used for the mold closing step and the mold opening step. The following refers to servomotor 80C as a "mold opening and closing motor 80C" in some cases.

Injection molding machine 100 performs a step referred to as the "ejection step" after the mold opening step. The ejection step is a step of taking out, from mold 17, an injection material such as a resin that is solidified after molds 17 and 18 are filled with the injection material. Specifically, an ejection motor 80D rotates to eject an unillustrated pin or the like. This takes the molded article off that is in close contact with mold 17. Servomotor 80D provided in movable plate 14 is a motor that is used for the ejection step. Servomotor 80D is referred to as the "ejection motor 80D" in some cases.

<Injection Device>

Injection device 20 includes a base 21, a heating cylinder 22, a screw 23, a drive mechanism 24, a hopper 25, an injection nozzle 26, a nozzle touch device 27, thermocouples 29A to 29C, and servomotors 80A and 80B. Base 21 is disposed on the positive direction side of the X axis with respect to bed 11. Base 21 holds drive mechanism 24 and the like. Servomotors 80A and 80B are provided in drive mechanism 24.

Screw 23 is disposed in heating cylinder 22. Injection molding machine 100 uses screw 23 to perform a step referred to as the "plasticization step". The plasticization step is a step of kneading a resin to be injected by using the heating of heating cylinder 22 and the rotation of screw 23. Servomotor 80B in drive mechanism 24 rotates screw 23 by using the X-axis direction as a central axis. In other words, servomotor 80B is a motor that is used for the plasticization step. The following refers to servomotor 80B as a "plasticization motor 80B" in some cases.

Further, injection molding machine 100 performs a step referred to as the "injection step" and a step referred to as the "pressure keeping step". The injection step is a step of injecting the resin plasticized in the plasticization step to molds 17 and 18. The pressure keeping step is a step of applying pressure to hold the resin injected in the injection step in molds 17 and 18. Driven servomotor 80A slides screw 23 to the negative direction side of the X-axis direction. This injects the plasticized resin to molds 17 and 18 by screw 23. Servomotor 80A is a motor that is used for the injection step or the pressure keeping step. The following refers to servomotor 80A as an "injection motor 80A" in some cases.

Hopper 25 is provided on the positive direction side of the Z axis with respect to heating cylinder 22. Injection nozzle 26 is provided at the end of heating cylinder 22 on the negative direction side of the X axis. Nozzle touch device 27 slides injection device 20 in the X-axis direction to bring injection nozzle 26 into contact with the sprue bush of mold 18. Thermocouples 29A to 29C may be disposed near injection nozzle 26 and near heating cylinder 22. Thermocouples 29A to 29C are temperature sensors that detect the temperatures of portions at which thermocouples 29A to 29C are disposed.

Base 21 includes control devices 40A to 40D and servo amplifiers 50A to SOD inside. Servo amplifiers 50A to 50D respectively supply servomotors 80A to 80D with power.

More specifically, servo amplifiers 50A to 50D each generate a three-phase alternating-current voltage and supply the corresponding servomotor with the three-phase alternating current power. Control devices 40A to 40D respectively control servo amplifiers 50A to SOD to execute a molding cycle. Respective control devices 40A to 40D are electrically connected to each other.

Operating panel 30 displays information related to injection molding machine 100 and receives an operation from a user. Operating panel 30 is electrically connected to at least one of control devices 40A to 40D. In the example of FIG. 1, operating panel 30 is provided on the negative direction side of the Y axis with respect to injection molding machine 100. According to an aspect, operating panel 30 may be provided as an entity different from injection molding machine 100. For example, operating panel 30 may be disposed in a room different from the room in which injection molding machine 100 is disposed.

Operating panel 30 includes a display 31 and an input device 32. Input device 32 includes, for example, a plurality of buttons. According to an aspect, display 31 and input device 32 may be integrally provided as a touch panel. In addition, operating panel 30 may include a microphone and a speaker to receive an operation from a user by using sound.

<Schematic Block Diagram of Injection Molding Machine>

Figure 2:
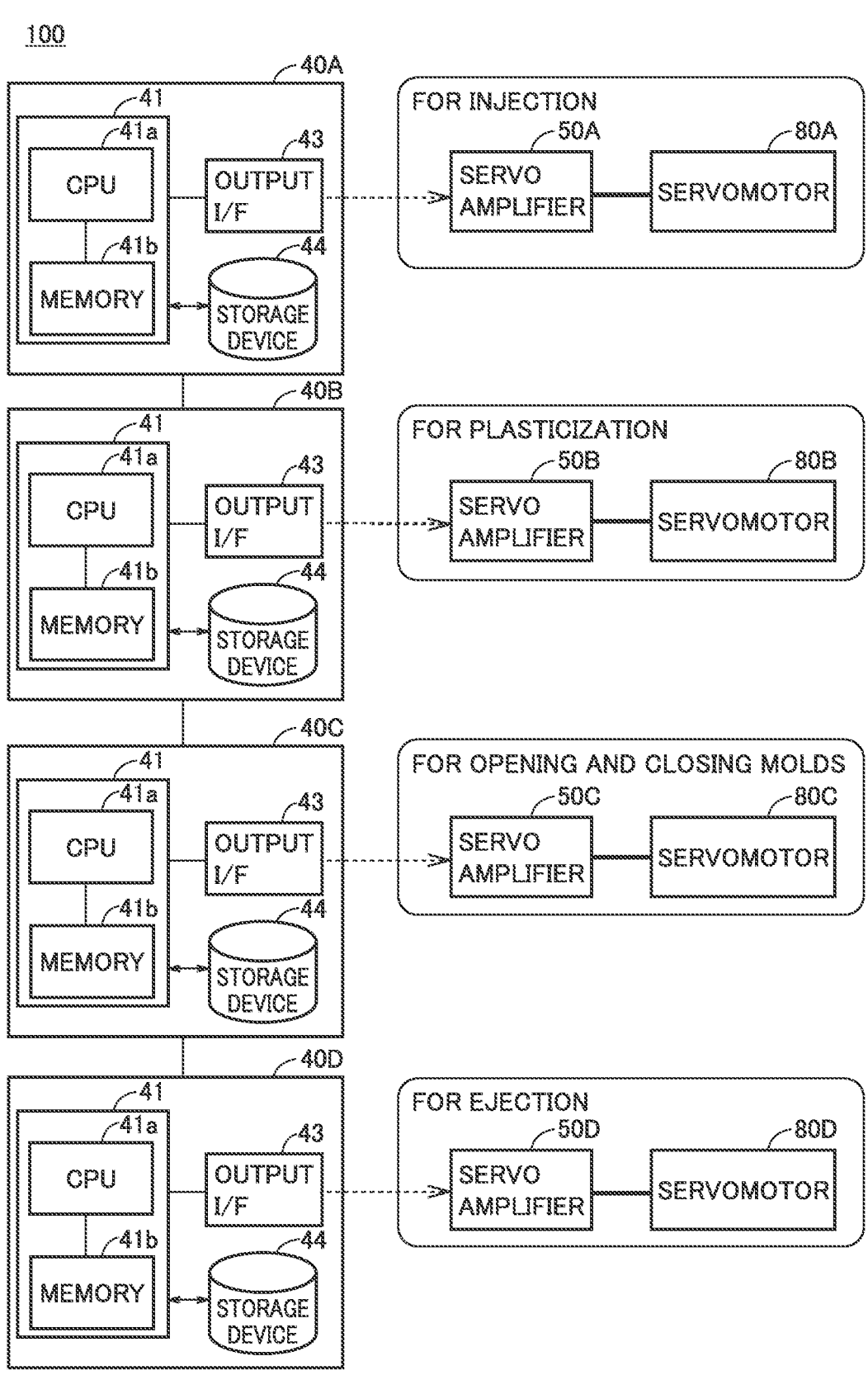
FIG. 2 is a schematic block diagram of the injection molding machine according to the first embodiment.

FIG. 2 is a schematic block diagram of injection molding machine 100 according to the first embodiment. As illustrated in FIG. 2, injection molding machine 100 includes control devices 40A to 40D, servo amplifiers 50A to 50D, and servomotors 80A to 80D described in FIG. 1.

As described in FIG. 1, servo amplifier 50A and servomotor 80A are used for the injection step. Servo amplifier 50B and servomotor 80B are used for the plasticization step. Servo amplifier 50C and servomotor 80C are used for the mold opening and closing step. Servo amplifier 50D and servomotor 80D are used for the ejection step. The supply paths of power for driving servomotors 80A to 80D are illustrated between servo amplifiers 50A to 50D and servomotors 80A to 80D, respectively. FIG. 1 omits a system power supply.

The following describes an internal configuration of control device 40A. It is to be noted that each of control devices 40B to 40C has an internal configuration similar to that of control device 40A as illustrated in FIG. 2. The internal configuration of each of control devices 40B to 40C will not be thus repeatedly described. In addition, in the internal configuration of each of control devices 40B to 40C, the same or corresponding portions as or to internal components in the internal configuration of control device 40A are denoted by the same reference numerals. Control device 40A includes a control unit 41, an output interface 43, and a storage device 44. Control unit 41 of control device 40A is connected to servo amplifier 50A through output interface 43 to allow a control signal to be transmitted. Control unit 41 of control device 40A transmits a control signal to servo amplifier 50A to control the state of a switching element described below.

Control unit 41 includes a CPU 41a and a memory 41b. CPU 41a loads a program in a RAM (Random Access Memory) and executes the program. The program is stored in a ROM (Read Only Memory). Memory 41b includes the ROM and the RAM. Memory 41b stores the program and the like to be executed by CPU 41a.

According to an aspect, control unit 41 may include a dedicated hardware circuit. In other words, control unit 41 may be implemented by an ASIC (Application Specific Integrated Circuit), an FPGA (Field-Programmable Gate Array), or the like. In addition, control unit 41 may be implemented by appropriately combining a processor and a memory, an ASIC, an FPGA, or the like. Storage device 44 may include, for example, an HDD (Hard Disk Drive), an SSD (Flash Solid State Drive), or the like.

<Description of Electrical Circuit>

Figure 3:
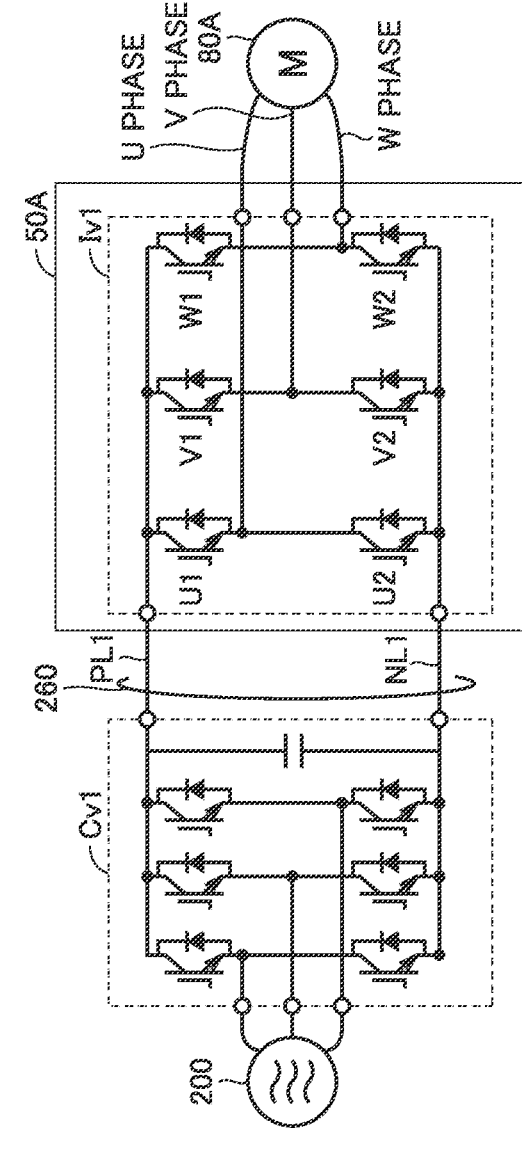
FIG. 3 is a diagram illustrating a detail of an electrical circuit configuration of a servo amplifier according to the first embodiment.

FIG. 3 is a diagram illustrating a detail of an electrical circuit configuration of servo amplifier 50A according to the first embodiment. In FIG. 3, the electrical circuit configuration of servo amplifier 50A will be described as an example, but servo amplifier 50B to servo amplifier 50D also have electrical circuit configurations similar to that of servo amplifier 50A.

One of the ends of servo amplifier 50A is electrically connected to servomotor 80A and the other end of servo amplifier 50A is electrically connected to an AC/DC converter Cv1 through a direct-current bus 260. AC/DC converter Cv1 includes three-phase full-bridge-type PWM rectifier.

AC/DC converter Cv1 converts alternating-current power supplied from a system power supply 200 to direct-current power and supplies the converted direct-current power to direct-current bus 260. Direct-current bus 260 includes two power supply lines PL1 and NL1. It is to be noted that AC/DC converter Cv1 may include a filter circuit for removing a high-frequency noise component, a step-up transformer, and the like, but the example of FIG. 3 omits them for the sake of simplified description. A smoothing capacitor is disposed between power supply lines PL1 and NL1 in direct-current bus 260.

Servo amplifier 50A includes a three-phase full-bridge-type inverter Iv1. Inverter Iv1 includes switching elements U1, U2, V1, V2, W1, and W2 disposed between power supply lines PL1 and NL1 of direct-current bus 260. The following generically refers to switching elements U1, U2, V1, V2, W1, and W2 as "switching elements U1 to W2". In addition, switching elements U1, V1, and W1 are generically referred to as an "upper arm" and switching elements U2, V2, and W2 are generically referred to as a "lower arm" in some cases. Switching element U1 may correspond to a "first switching element" according to the present disclosure. Switching element V1 may correspond to a "second switching element" according to the present disclosure.

In inverter Iv1, switching elements U1, V1, and W1 and switching elements U2, V2, and W2 are complementarily switched. In other words, when switching element U1 is on, switching element U2 is off.

The U phase of servomotor 80A is connected to a connection node between switching elements U1 and U2 connected in series between power supply lines PL1 and NL1. The V phase of servomotor 80A is connected to a connection node between switching elements V1 and V2 connected in series between power supply lines PL1 and NL1. The W phase of servomotor 80A is connected to a connection node between switching elements W1 and W2 connected in series between power supply lines PL1 and NL1.

As described in FIG. 2, servo amplifier 50A is controlled by control device 40A of injection molding machine 100. Specifically, control device 40A transmits control signals to respective switching elements U1 to W2 to control the states of respective switching elements U1 to W2. This causes servo amplifier 50A to convert direct-current power from direct-current bus 260 to alternating-current power and drive servomotor 80A.

Each of switching elements U1 to W2 is a metal oxide semiconductor field effect transistor (MOSFET), an insulated gate bipolar transistor (IGBT), or the like. Control unit 41 applies gate voltages to the control terminals (gate terminals) of switching elements U1 to W2 as control signals to turn on switching elements U1 to W2. The application of a gate voltage to each of switching elements U1 to W2 causes the consumption of power. The loss by gate resistance and the loss by switch resistance cause power to be consumed.

<Operation of Switching Element>

FIG. 4 is a diagram for describing an operation of each of switching elements U1 to W2. In the present embodiment, servomotor 80A is controlled by three control techniques. Specifically, servomotor 80A is configured to allow motor rotation control, zero-speed control, and servo-off control illustrated in FIG. 4 to be executed thereon. The motor rotation control may correspond to "first control" according to the present disclosure. The servo-off control may correspond to "second control" according to the present disclosure. The zero-speed control may correspond to "third control" according to the present disclosure. It is to be noted that the zero-speed control may include position control described below. In other words, when control device 40A detects the rotation of the servomotor while performing the zero-speed control, control device 40A may return the angle of the servomotor to a predetermined angle.

The motor rotation control is control to rotate servomotor 80A. Control device 40A switches the respective switching elements U1 to W2 at a timing of rotating servomotor 80A, for example, by 120-degree conduction. In other words, the motor rotation control is control to rotate servomotor 80A by performing control to turn on switching elements U1, V1, and W1 of the upper arm in different phases. When the motor rotation control is performed, switching elements U1 to W2 undergo the consumption of power brought about by the application of gate voltages and the consumption of power supplied from the system power supply and used to drive servomotor 80A.

The zero-speed control is control to stop the rotation of servomotor 80A to keep the rotation speed at zero. In other words, the zero-speed control is control to stop the rotation of servomotor 80A by repeatedly turning on and off respective switching elements U1 to W2 in the same phase.

In the example of the zero-speed control illustrated in FIG. 4, control device 40A repeats, in the same phase, a period in which the upper arm is turned off and the lower arm is turned on and a period in which the upper arm is turned on and the lower arm is turned off. This causes the U phase, the V phase, and the W phase of servomotor 80A to have the same voltage value and stops the rotation of servomotor 80A.

It is to be noted that control under which switching elements U1 to W2 are repeatedly turned on and off is illustrated in the example of the zero-speed control in FIG. 4, but switching elements U1, V1, and W1 of the upper arm may be constantly on and switching elements U2, V2, and W2 of the lower arm may be constantly off in a period in which the zero-speed control is being performed. In addition, in the period in which the zero-speed control is being performed, switching elements U1, V1, and W1 of the upper arm may be constantly off and switching elements U2, V2, and W2 of the lower arm may be constantly on. In other words, in the zero-speed control period, switching elements U1 to W2 do not have to be repeatedly switched.

When servomotor 80A receives external force and the rotation angle of servomotor 80A changes during the zero-speed control, servomotor 80A receives force that prevents the rotation angle from changing if at least one of switching elements U1 to W2 is on. This allows servomotor 80A to stop while keeping the rotation angle. As illustrated in FIG. 4, a gate voltage is applied to at least one of switching elements U1 to W2 when the zero-speed control is performed. This causes the consumption of power.

The servo-off control is control to stop the rotation without applying any force to servomotor 80A. As illustrated in FIG. 4, control device 40A turns off all of switching elements U1, V1, and W1. In other words, the servo-off control is control to stop the rotation of servomotor 80A by turning off each of switching elements U1 to W2.

When servomotor 80A receives external force during the servo-off control, the external force changes the rotation angle of servomotor 80A. In contrast, as illustrated in FIG. 4, when the servo-off control is performed, no gate voltages are applied to switching elements U1 to W2. No power is thus consumed. FIG. 4 has described the respective kinds of control by using control device 40A, but control devices 40B to 40D are similarly configured to be capable of performing the motor rotation control, the zero-speed control, and the servo-off control on servo amplifiers 50B to 50D.

<Molding Cycle>

Figure 5:
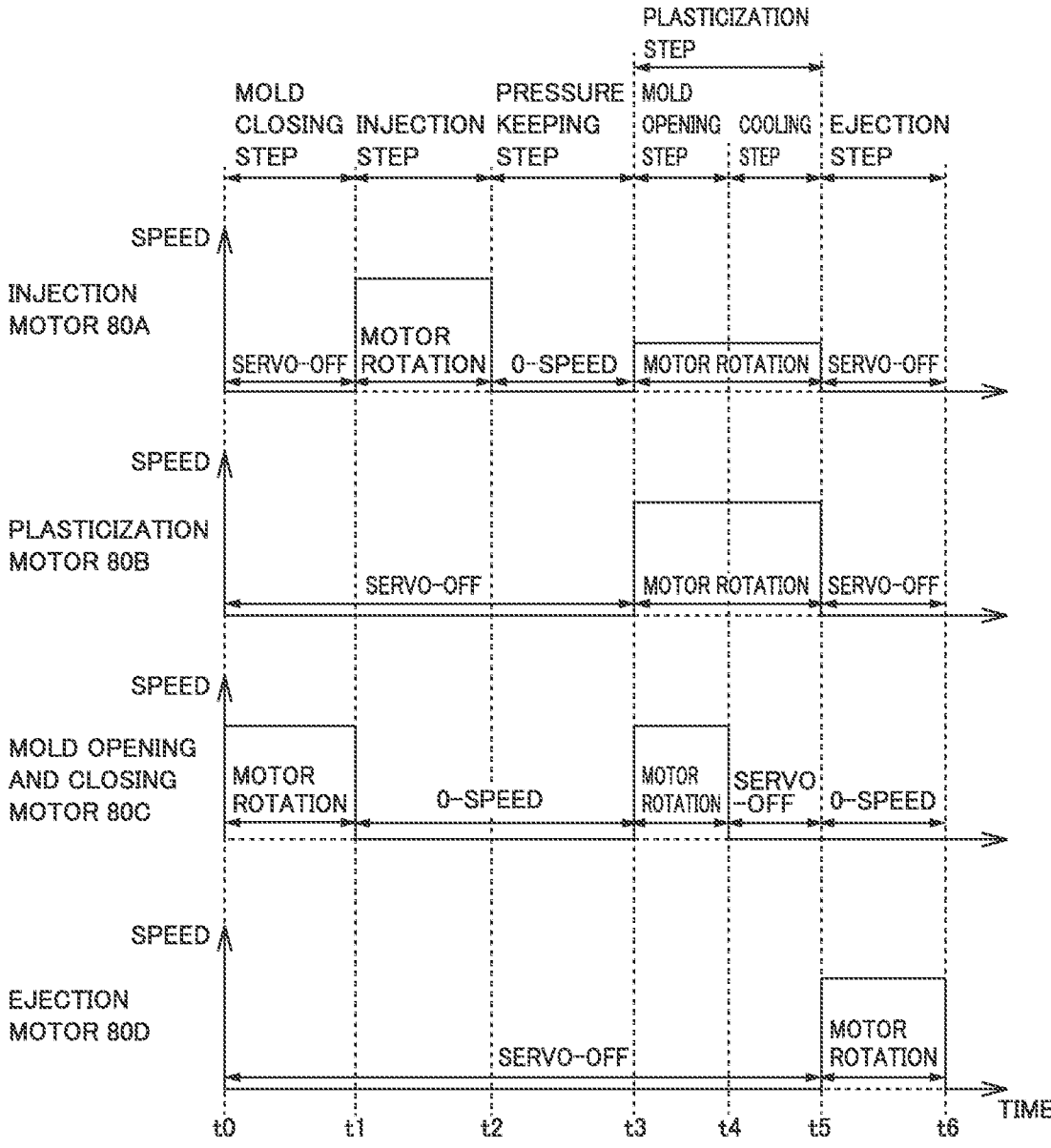
FIG. 5 is a diagram for describing a molding cycle according to the first embodiment.

FIG. 5 is a diagram for describing a molding cycle according to the first embodiment. As described above, injection molding machine 100 according to the present embodiment consecutively repeats a molding cycle to produce a plurality of molded articles. FIG. 5 illustrates control performed on each of servomotors 80A to 80D in one molding cycle.

The molding cycle includes the mold closing step, the injection step, the pressure keeping step, the plasticization step, the mold opening step, the cooling step, and the ejection step. The cooling step is a step of cooling the injection material in mold 17 for solidification after the mold opening step. Injection molding machine 100 according to the present embodiment may cool the injection material in the cooling step by using an unillustrated cooling device.

As illustrated in FIG. 5, the injection molding process is achieved by driving respective servomotors 80A to 80D at predetermined timings in a predefined order in one molding cycle. FIG. 5 illustrates a period in which each of servomotors 80A to 80D is driven as a "motor rotation period". The motor rotation period is predefined for each of servomotors 80A to 80D on the basis of a molding condition such as the shape or the material quality of a molded article. The following refers to a period other than the "motor rotation period" in a molding cycle as a "motor stop period". In the present embodiment, any of the zero-speed control and the servo-off control is executed in the motor stop period. The motor rotation period may correspond to a "first period" according to the present disclosure. In addition, the motor stop period may correspond to a "second period" according to the present disclosure.

Mold opening and closing motor 80C rotates in the mold closing step between timings t0 and t1 to bring molds 17 and 18 into close contact. After the mold closing step is finished, injection motor 80A rotates in the injection step between timings t1 and t2 to inject an injection material to the molds. In other words, screw 23 slides in the negative direction of the X axis to inject the injection material to the molds. After the injection step is finished, none of respective servomotors 80A to 80D is driven in the pressure keeping step between timings t2 and t3.

After the pressure keeping step is finished, mold opening and closing motor 80C rotates in the mold opening step between timings t3 and t4 to separate molds 17 and 18. The rotation of injection motor 80A slides screw 23 in the positive direction of the X axis in the plasticization step between timings t3 and t5. The movement speed of screw 23 in plasticization step is lower than the movement speed of screw 23 in the injection step to return screw 23 to the position at which screw 23 used to be located.

In the plasticization step, plasticization motor 80B rotates screw 23 by using the X-axis direction as a central axis. This kneads an injection material to be used in the next molding cycle. Finally, in the ejection step between timings t5 and t6, ejection motor 80D rotates to eject an unillustrated pin or the like. This takes the molded article off that is in close contact with mold 17.

As illustrated in FIG. 5, motor rotation periods of injection motor 80A are the period between timings t1 and t2 and the period between timings t3 and t5. Motor rotation periods of plasticization motor 80B are the periods between timings t3 and t5. Motor rotation periods of mold opening and closing motor 80C are the period between timings t0 and t1 and the period between timings t3 and t4. A motor rotation period of ejection motor 80D is the period between timings t5 and t6.

<Zero-Speed Control and Servo-Off Control>

It is predefined in injection molding machine 100 according to the first embodiment which of the zero-speed control or the servo-off control is executed by each of servomotors 80A to 80D in not a motor rotation period, but a motor stop period. Specifically, as illustrated in FIG. 5, in injection motor 80A, the servo-off control is performed in the mold closing step and the ejection step and the zero-speed control is performed in the pressure keeping step. In plasticization motor 80B, the servo-off control is performed in all of the steps other than the plasticization step.

In mold opening and closing motor 80C, the zero-speed control is performed in the injection step, the pressure keeping step, and the ejection step and the servo-off control is performed in the cooling step. In ejection motor 80D, the servo-off control is performed in all of the steps other than the ejection step. As illustrated in FIG. 5, the following refers to a period in which the servo-off control is being performed as a "servo-off period" and a period in which the zero-speed control is being performed as a "zero-speed period".

The pressure keeping step is a step of applying pressure to the injection material in molds 17 and 18 by fixing screw 23 slid to the negative direction side of the X axis in the injection step. In the pressure keeping step, reaction from the injection material having pressure applied thereto causes screw 23 to receive force that is pushing back screw 23 to the positive direction side of the X axis. Injection molding machine 100 according to the first embodiment thus performs the zero-speed control on injection motor 80A in the pressure keeping step to prevent screw 23 from being pushed back to the positive direction side of the X axis and prevent screw 23 from losing the pressure kept on the injection material.

In the injection step, reaction is also generated from the injection material for a reason similar to that of the pressure keeping step. Molds 17 and 18 also receive reaction that applies pressure to the injection material in addition to screw 23. Specifically, the injection material having pressure applied thereto in molds 17 and 18 applies, to molds 17 and 18, force that is separating molds 17 and 18. Control unit 41 of control device 40C thus performs the zero-speed control on mold opening and closing motor 80C in both the injection step and the pressure keeping step as illustrated in FIG. 5. This allows injection molding machine 100 according to the first embodiment to keep the positions of molds 17 and 18 against the reaction from the injection material in the injection step and the pressure keeping step.

As illustrated in FIG. 1, ejection motor 80D is provided in movable plate 14. A pin is ejected by driven ejection motor 80D to take the molded article off that is in close contact with mold 17. Movable plate 14 is, however, moved in the X-axis direction in some cases by the influence of the reaction brought about by the ejected pin. As illustrated in FIG. 5, the zero-speed control is thus performed in mold opening and closing motor 80C in the ejection step in which ejection motor 80D is driven. In the first embodiment, the example has been described in which control devices 40A to 40D respectively control servo amplifiers 50A to 50D, but servo amplifiers 50A to 50D may be controlled by one control device. In other words, respective control devices 40A to 40D may be provided as not different entities, but one control device.

In this way, injection molding machine 100 according to the first embodiment executes the zero-speed control only in a period in which each of servomotors 80A to 80D may receive external force and executes the servo-off control in a period in which another component of injection molding machine 100 exerts no external force. This causes all of switching elements U1 to W2 to be off in longer periods than the periods in which all of switching elements U1 to W2 are off when the zero-speed control is performed in all of the motor stop periods. It is possible to suppress the consumption of power. In other words, it is possible in injection molding machine 100 according to the first embodiment to prevent the rotation angle from unintentionally changing due to the reception of external force by each of servomotors 80A to 80D and reduce the consumption of power and stop the rotation of each of servomotors 80A to 80D.

Second Embodiment

In the first embodiment, the example has been described in which a zero-speed period and a servo-off period in a molding cycle are predefined. As described above, a motor rotation period in a molding cycle, however, changes in accordance with a molding condition such as the shape or the material quality of the injection material of a molded article. It is thus necessary to define a zero-speed period and a servo-off period again for each molding condition. In a second embodiment, a technique will be described that automatically decides a zero-speed period and a servo-off period in a molding cycle by performing a test cycle. It is to be noted that a component similar to that of the first embodiment will not be repeatedly described in the second embodiment.

Figure 6:
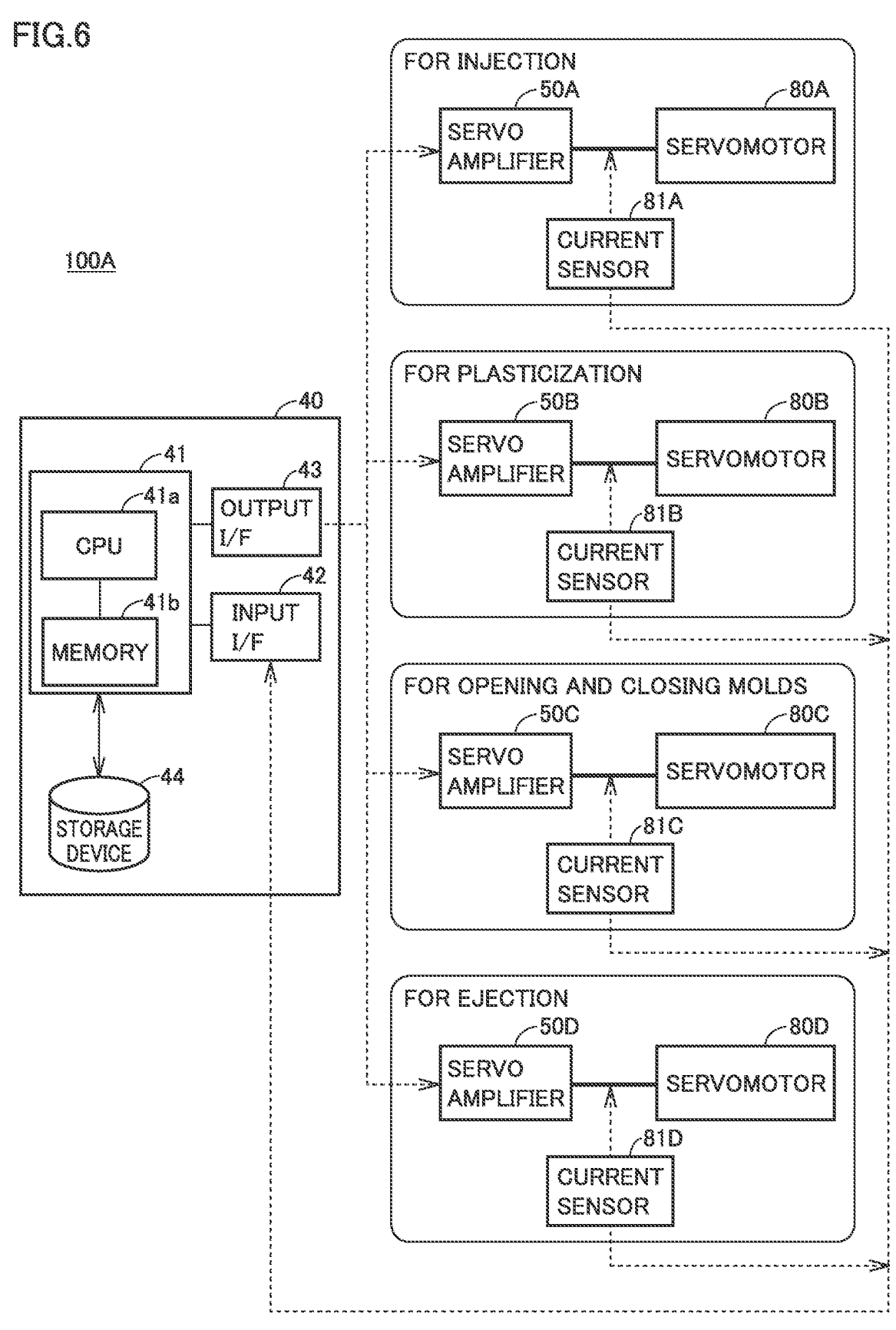
FIG. 6 is a schematic block diagram of an injection molding machine according to a second embodiment.

FIG. 6 is a schematic block diagram of an injection molding machine 100A according to the second embodiment. Injection molding machine 100A is provided with a current sensor for each of servomotors 80A to 80D. In addition, in the second embodiment, one control device 40 controls respective servo amplifiers 50A to 50D. According to an aspect, injection molding machine 100A according to the second embodiment may also be provided with control devices 40A to 40D that respectively control servo amplifiers 50A to 50D as described in the first embodiment. In that case, the flowchart of FIG. 7 described below may be executed by any one of control devices 40A to 40D or another control device that integrally controls control devices 40A to 40D. As illustrated in FIG. 6, injection molding machine 100A includes current sensors 81A to 81D in addition to control device 40, servo amplifiers 50A to 50D, and servomotors 80A to 80D. In addition, control device 40 includes an input interface 42 in addition to output interface 43.

Current sensors 81A to 81D respectively detect the motor currents of servomotors 80A to 80D. Each of current sensors 81A to 81D transmits the detected current value to control unit 41 through input interface 42. In each of servomotors 80A to 80D, the motor current has correlation with torque generated in the motor. Storage device 44 stores the value of the torque in association with the current value detected by each of current sensors 81A to 81D. In other words, control unit 41 is capable of estimating the torques generated in servomotors 80A to 80D on the basis of the values of the detection by current sensors 81A to 81D.

<Technique of Deciding Zero-Speed Period and Servo-Off Period by Test Cycle>

FIG. 7 is a flowchart illustrating a processing procedure for deciding a zero-speed period and a servo-off period. The flowchart illustrated in FIG. 7 is stored in storage device 44 as a program and the program is executed by control unit 41.

In the second embodiment, a test cycle is executed before a molding cycle is begun. The test cycle is an experimental cycle having the same motor rotation period and motor stop period as those of the molding cycle. In the second embodiment, a zero-speed period and a servo-off period are decided on the basis of torque generated in a motor stop period in a test cycle. Control unit 41 executes the flowchart illustrated in FIG. 7 before executing a molding cycle.

Figure 8:
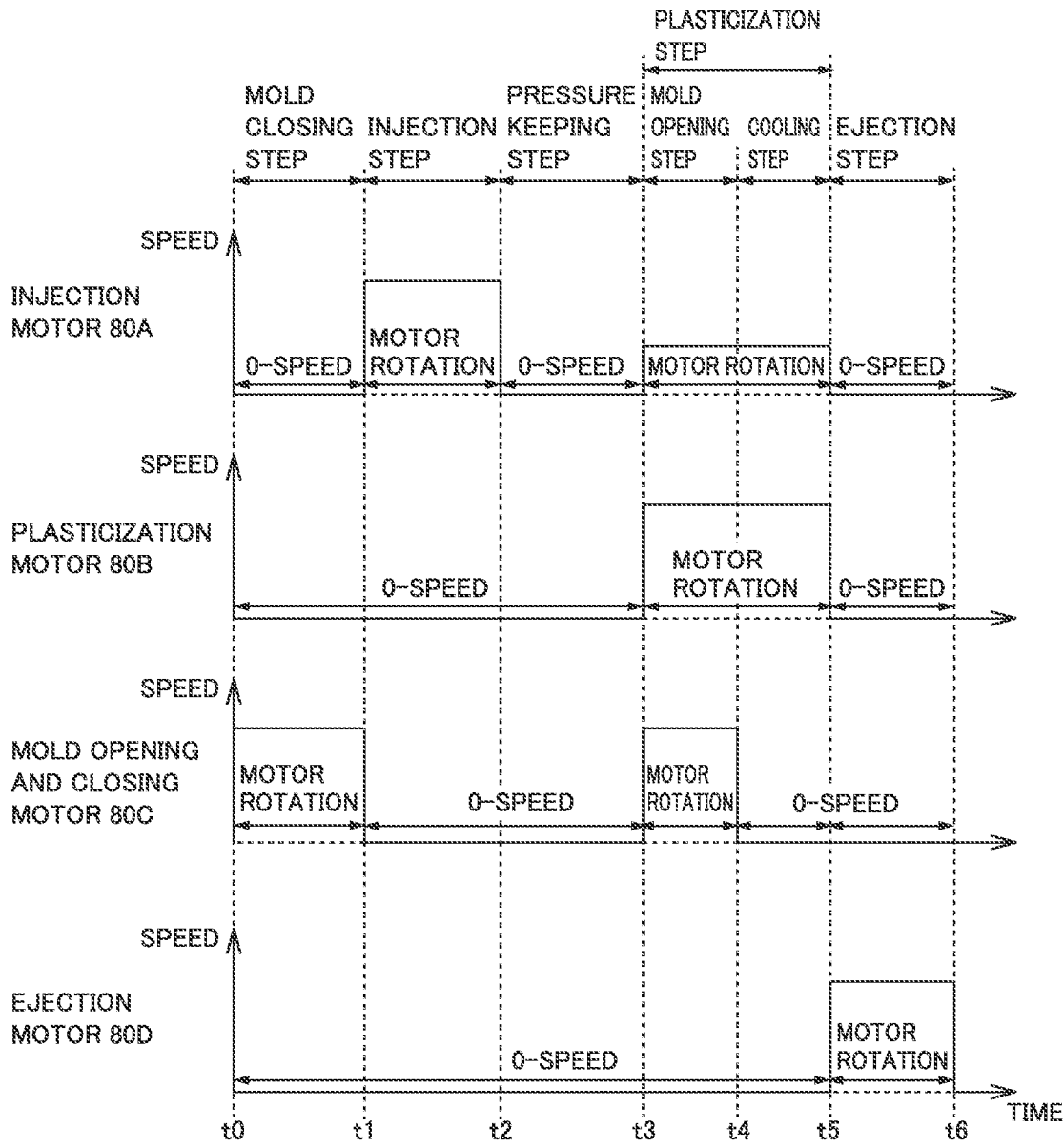
FIG. 8 is a diagram for describing a test cycle according to the second embodiment.

Control unit 41 executes a test cycle (step S100). The test cycle is a cycle in which the zero-speed control is performed in all of the motor stop periods. FIG. 8 is a diagram for describing the test cycle according to the second embodiment. As illustrated in FIG. 8, the servo-off control is not executed, but only the motor rotation control and the zero-speed control are performed in the test cycle. A "motor rotation period" illustrated in FIG. 8 may correspond to a "third period" according to the present disclosure. A "zero-speed period" illustrated in FIG. 8 may correspond to a "fourth period" according to the present disclosure.

FIG. 7 will be referenced again. Control unit 41 determines whether or not the test cycle is finished (step S110). When the test cycle is not finished (NO in step S110), control unit 41 repeats the processing of step S110. When the test cycle is finished (YES in step S110), control unit 41 acquires results of detection by current sensors 81A to 81D in the test cycle executed in step S100 (step S120).

Control unit 41 defines the zero-speed periods and the servo-off periods of respective servomotors 80A to 80D in a molding cycle on the basis of the values of the detection by current sensors 81A to 81D (step S130). In step S130, control unit 41 determines whether or not the result of the detection by each of current sensors 81A to 81D is a predetermined threshold or more in a specific period within a motor stop period. When the current value detected within the specific period is the predetermined threshold or more, control unit 41 determines that external force generates torque in the specific period. In this case, control unit 41 defines, as a zero-speed period, the period in the molding cycle corresponding to the specific period.

In contrast, when the current value detected within the specific period is less than the predetermined threshold, control unit 41 determines that external force generates no torque in the specific period. In this case, control unit 41 defines, as a servo-off period, the period in the molding cycle corresponding to the specific period. It is to be noted that the specific period may be a period indicating one step or a period of one second within a motor stop period.

This will be described with a more specific example. When control unit 41 determines from the value of detection by current sensor 81A that injection motor 80A receives external force in the pressure keeping step from timing t2 to timing t3 illustrated in FIG. 8, control unit 41 defines the pressure keeping step in a molding cycle as a zero-speed period. In contrast, when control unit 41 determines from the value of detection by current sensor 81A that injection motor 80A receives no external force in the mold closing step from timing t0 to timing t1 illustrated in FIG. 8, control unit 41 defines the pressure keeping step in a molding cycle as a servo-off period.

In this way, control unit 41 decides the zero-speed periods and the servo-off periods of respective servomotors 80A to 80D in a molding cycle on the basis of results of the detection by current sensors 81A to 81D in the test cycle. Control unit 41 executes a molding cycle in accordance with a zero-speed period and a servo-off period defined in S130 (step S140). This makes it possible in the second embodiment to define a zero-speed period and a servo-off period in a molding cycle on the basis of a test cycle for determining whether or not external force actually occurs. In addition, in the second embodiment, a user does not have to take into consideration the presence or absence of the occurrence of external force in each period by himself or herself. This makes it possible to automatically decide a zero-speed period and a servo-off period in a molding cycle by simply performing a test cycle.

Third Embodiment

In the second embodiment, the technique has been described that automatically decides a zero-speed period and a servo-off period by executing a test cycle in advance before executing a molding cycle. However, unexpected external force brought about by an earthquake, an accident, a malfunctioning part included in injection molding machine 100, and the like occurs in a servo-off period determined by a test cycle in some cases. In a third embodiment, a technique will be described that uses a speed sensor which detects the rotation speed of a motor to decide in real time which of the zero-speed control and the servo-off control is performed. It is to be noted that a component similar to that of the second embodiment will not be repeatedly described in the third embodiment.

Figure 9:
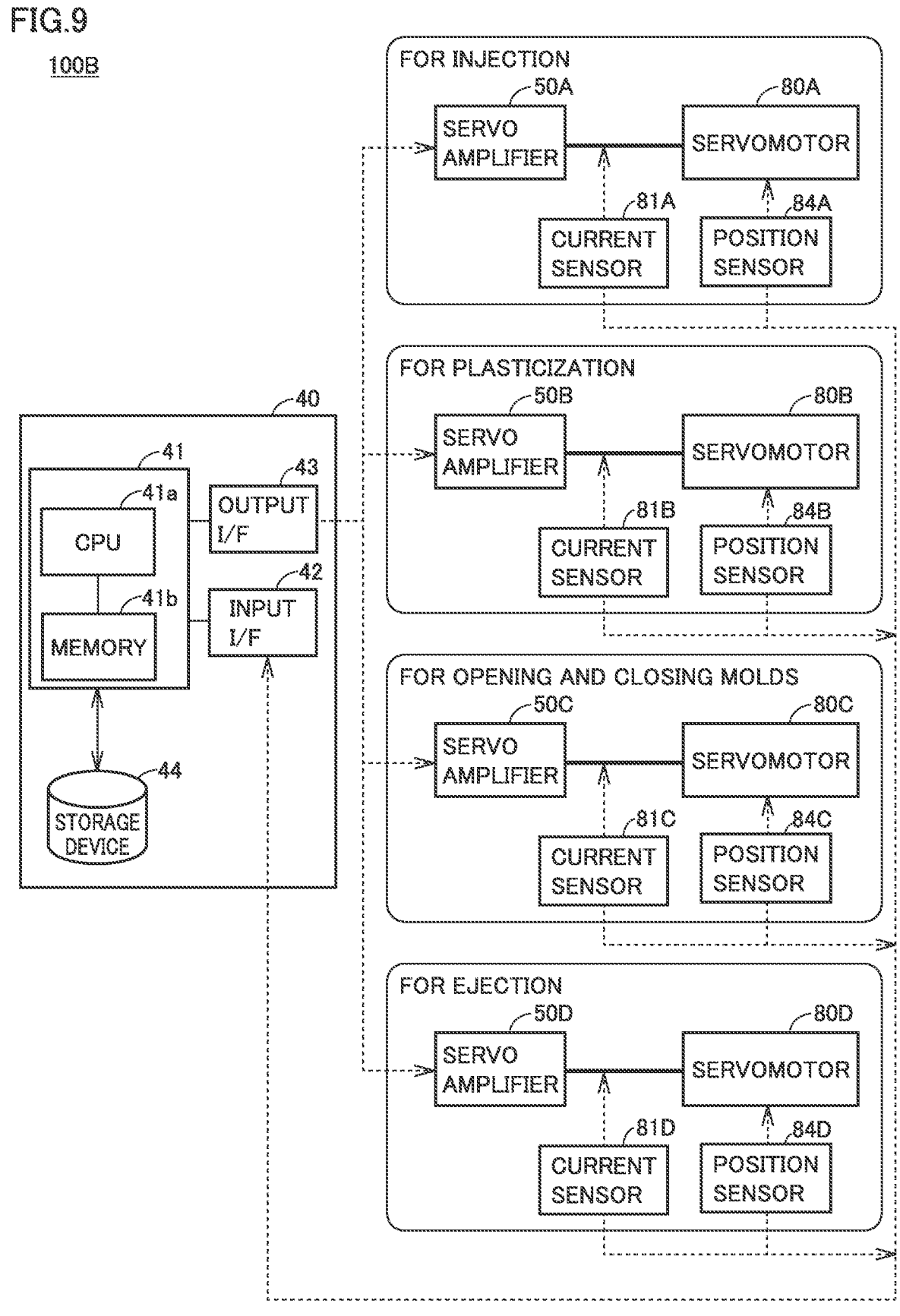
FIG. 9 is a schematic block diagram of an injection molding machine according to a third embodiment.

FIG. 9 is a schematic block diagram of an injection molding machine 100B according to the third embodiment. Injection molding machine 100B is provided with a position sensor for each of servomotors 80A to 80D. Specifically, as illustrated in FIG. 9, injection molding machine 100B further includes position sensors 84A to 84D in addition to the components in the second embodiment.

Each of position sensors 84A to 84D is, for example, an optical encoder. Position sensors 84A to 84D respectively detect the rotation speeds of servomotors 80A to 80D. In addition, position sensors 84A to 84D respectively detect the rotation angles of servomotors 80A to 80D. According to an aspect, each of position sensors 84A to 84D is not provided as one optical encoder, but position sensors 84A to 84D may be provided in different entities as speed sensors that each detect rotation speed and angle sensors that each detect a rotation angle.

Position sensors 84A to 84D transmit results detected by respective position sensors 84A to 84D to control unit 41 through input interface 42. This allows control unit 41 to acquire the rotation speeds and the rotation angles of servomotors 80A to 80D.

<Switching Between Zero-Speed Control and Servo-Off Control>

Figure 10:
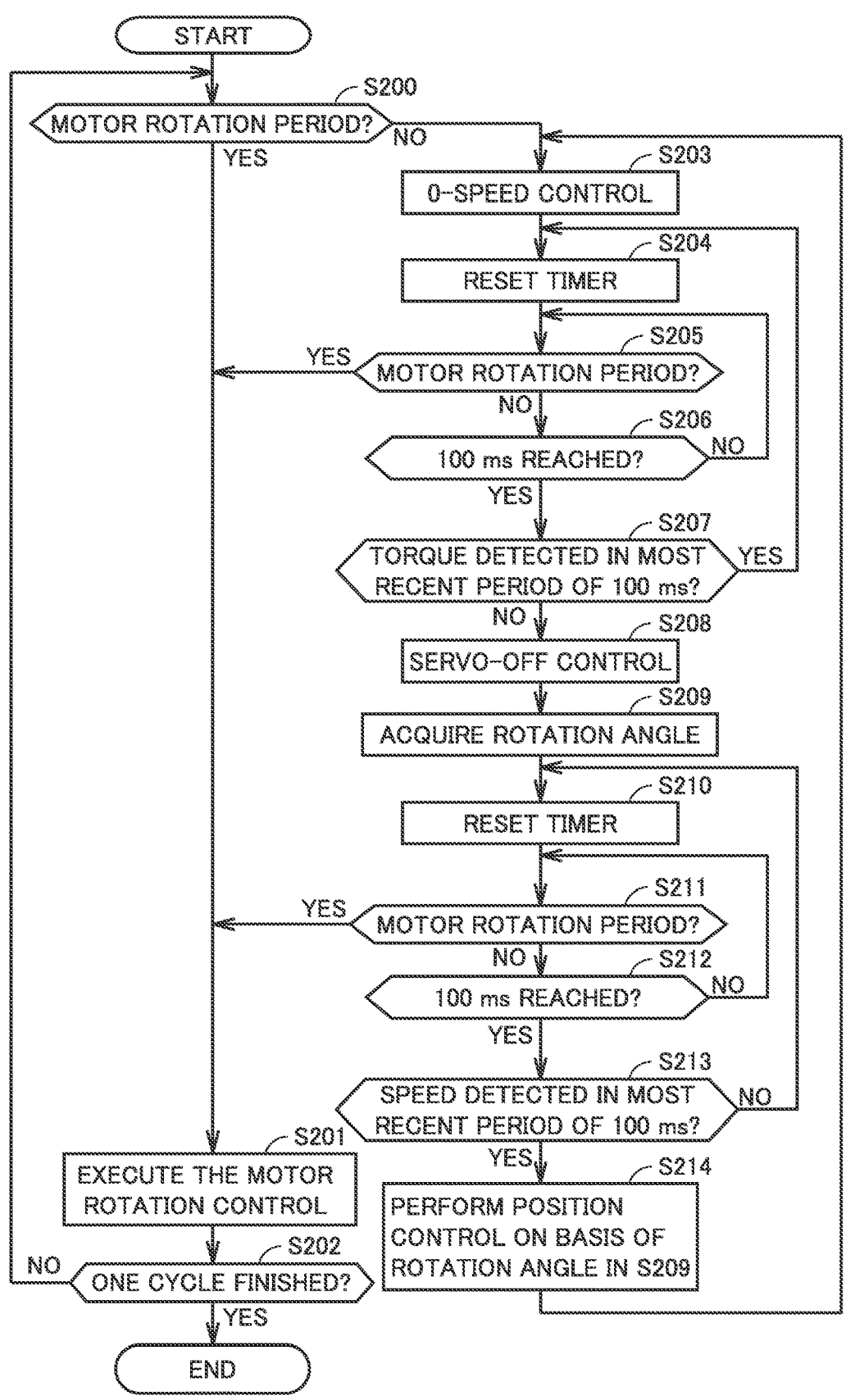
FIG. 10 is a flowchart illustrating a processing procedure of switching zero-speed control and servo-off control according to the third embodiment.

FIG. 10 is a flowchart illustrating a processing procedure of switching the zero-speed control and the servo-off control according to the third embodiment. In the third embodiment, control unit 41 performs the zero-speed control only in a necessary period by executing the flowchart illustrated in FIG. 10 without performing a test cycle.

The flowchart illustrated in FIG. 10 indicates a processing procedure for executing one molding cycle. Control unit 41 executes the flowchart illustrated in FIG. 10 separately for respective servomotors 80A to 80D. In the third embodiment, a motor rotation period is also predefined in accordance with a molding condition.

Figure 11:
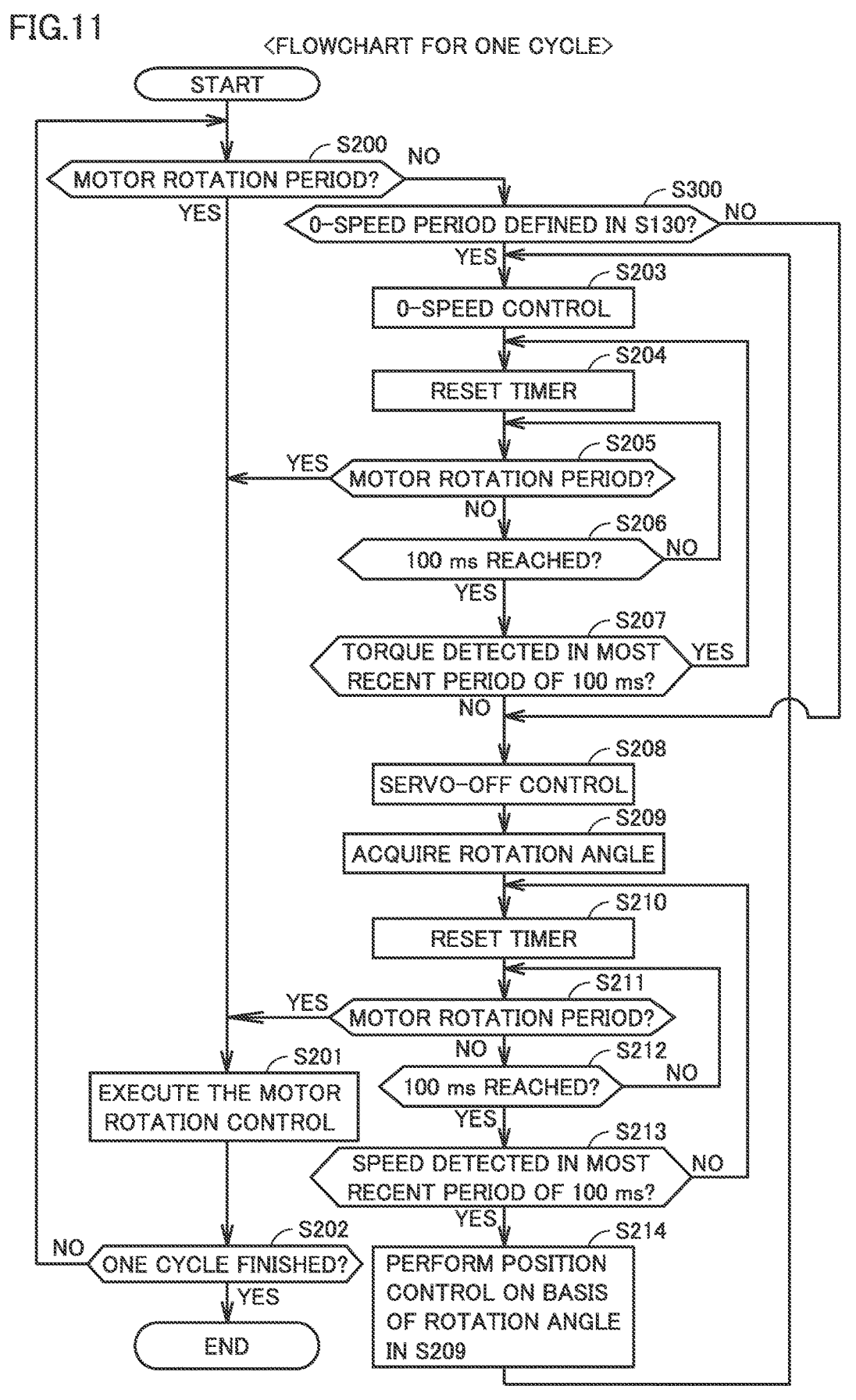

Control unit 41 determines after a molding cycle is begun whether or not a motor rotation period is entered (step S200). When a motor rotation period is entered (YES in step S200), control unit 41 executes the motor rotation control described in FIG. 4 (step S201). For example, when the flowchart of FIG. 10 is executed on mold opening and closing motor 80C, a motor rotation period begins immediately after a molding cycle is begun as illustrated in FIG. 5. In the flowchart of FIG. 11, after the motor rotation control is executed in step S201, the zero-speed control or the servo-off control is performed or the motor rotation control continuously remains executed until one cycle is finished.

Subsequently, control unit 41 determines whether or not one molding cycle is finished (step S202). When control unit 41 determines that one molding cycle is not finished (NO in step S202), control unit 41 returns the processing to step S200.

After that, control unit 41 determines again whether or not a motor rotation period is entered (step S200). When a motor rotation period is not entered (NO in step S200), control unit 41 performs the zero-speed control (step S203). For example, when the flowchart of FIG. 10 is executed on mold opening and closing motor 80C, control unit 41 repeats steps S200, 201, and 202 in the period from timing t0 to timing t1 in FIG. 5. The motor rotation period is finished at timing t1. Control unit 41 according to the third embodiment thus performs the zero-speed control on mold opening and closing motor 80C (step S203). In the flowchart of FIG. 11, after the zero-speed control is executed in step S203, the motor rotation control or the servo-off control is performed or the zero-speed control continuously remains executed until one cycle is finished.

Subsequently, control unit 41 resets a timer (step S204). The timer in step S204 is a general-purpose timer mounted, for example, on CPU 41a. Resetting the timer according to the present embodiment means returning the count of the timer to an initial value (0 seconds) and beginning counting.

Subsequently, control unit 41 determines whether or not a motor rotation period is entered (step S205). When a motor rotation period is not entered (NO in step S205), control unit 41 determines whether or not the value of the timer reaches 100 ms (step S206). When the value of the timer does not reach 100 ms (NO in step S206), control unit 41 determines whether or not a motor rotation period is entered (step S205). When a motor rotation period is reached before the value of the timer reaches 100 ms (YES in step S205), control unit 41 performs the motor rotation control (step S201).

When the value of the timer reaches 100 ms (YES in step S206), control unit 41 determines whether or not torque is detected in the period of 100 ms measured by the timer from step S204 (step S207). In other words, storage device 44 or memory 41b stores a value detected by a current sensor in the period of 100 ms measured by the timer from step S204. Control unit 41 determines whether or not the value of the detection by the current sensor in the period of 100 ms measured by the timer from step S204 is a predetermined threshold or more.

When torque is detected in the period of 100 ms measured by the timer from step S204 (YES in step S207), control unit 41 returns the processing to step S204 on the assumption that external force occurred in the most recent period of 100 ms. In other words, control unit 41 is continuously performing the zero-speed control further in a period of 100 ms.

When no torque is detected in step S207 in the period of 100 ms measured by the timer from step S204 (NO in step S207), control unit 41 switches the zero-speed control to the servo-off control on the assumption that no external force occurred in the most recent period of 100 ms (step S208). In the flowchart of FIG. 11, after the servo-off control is executed in step S208, the motor rotation control or the zero-speed control is performed or the servo-off control continuously remains executed until one cycle is finished.

In other words, no external force occurred in the most recent period of 100 ms and a period in which no external force occurs can thus continue in the next period of 100 ms. This causes control unit 41 to switch the zero-speed control to the servo-off control to reduce the consumption of power. In other words, when no torque is detected over a period of 100 ms in a period in which the zero-speed control is being executed, control unit 41 switches the zero-speed control to the servo-off control.

After switching the zero-speed control to the servo-off control, control unit 41 acquires the rotation angle of a servomotor from the value of detection by a position sensor (step S209). In other words, control unit 41 causes storage device 44 or memory 41b to store the rotation angle of the servomotor immediately after switching to the servo-off control.

Control unit 41 resets the timer (step S210). Control unit 41 determines whether or not a motor rotation period is entered (step S211). When a motor rotation period is not entered (NO in step S211), control unit 41 determines whether or not the value of the timer reaches 100 ms (step S212). When the value of the timer does not reach 100 ms (NO in step S212), control unit 41 determines whether or not a motor rotation period is reached before the value of the timer reaches 100 ms (step S211). When a motor rotation period is reached before the value of the timer reaches 100 ms (YES in step S211), control unit 41 performs the motor rotation control (step S201).

When the value of the timer reaches 100 ms (YES in step S212), control unit 41 determines whether or not the rotation speed is detected in the period of 100 ms measured by the timer from step S210 (step S213). In other words, it is determined whether or not the value of the position sensor in the period of 100 ms measured by the timer from step S210 is a predetermined threshold or more. Step S213 is different from step S207 and control unit 41 is executing the servo-off control. When a servomotor receives external force, the servomotor is thus rotated by the external force to have rotation speed.

When control unit 41 detects change of the rotation speed in the period of 100 ms measured by the timer from step S210 (YES in step S214), control unit 41 performs position control to locate the servomotor at the position of the rotation angle acquired in step S209 (step S214). This allows control unit 41 to return the rotation angle of the servomotor rotated by the external force to the rotation angle at which the external force has not yet occurred.

Control unit 41 assumes that external force occurred in the most recent period of 100 ms and control unit 41 switches the servo-off control to the zero-speed control (step S203). In other words, external force occurred in the most recent period of 100 ms and thus external force can also occur in the next period of 100 ms. To fix and stop the servomotor, control unit 41 switches the servo-off control to the zero-speed control.

When no rotation speed is detected in the period of 100 ms measured by the timer from step S210 (NO in step S213), control unit 41 returns the processing to step S211. In other words, control unit 41 is continuously performing the servo-off control further in a period of 100 ms. It is to be noted that standby periods indicated in step S206 and step S212 are not limited to 100 ms, but may be, for example, other periods such as 10 ms and 500 ms.

Although not illustrated in FIG. 10, control unit 41 also determines in steps S205 and 211 whether or not one cycle is finished in addition to determining whether a motor rotation period is entered. When determining in steps S205 and 211 that one cycle is finished, control unit 41 finishes the processing.

In this way, injection molding machine 100 according to the third embodiment does not have a test cycle or a user predefine a zero-speed period and a servo-off period, but detects external force occurring in a servo-off period by detecting rotation speed and switches the servo-off control to the zero-speed control in real time. This allows injection molding machine 100 according to the third embodiment to switch the servo-off control and the zero-speed control at an appropriate timing. It is to be noted that control devices 40A to 40D which respectively control servo amplifiers 50A to 50D may also be provided in the third embodiment. In that case, the flowchart of FIG. 10 may be executed by any one of control devices 40A to 40D or another control device that integrally controls control devices 40A to 40D.

First Modification Example

In the second embodiment, a zero-speed period and a servo-off period are defined on the basis of a test cycle. In the third embodiment, the zero-speed control and the servo-off control are switched on the basis of position sensors 84A to 84D. In a first modification example, a configuration obtained by combining the third embodiment with the second embodiment will be described.

Injection molding machine 100 according to the first modification example includes a component similar to that of the third embodiment illustrated in FIG. 9. In other words, injection molding machine 100 according to the first modification example includes position sensors 84A to 84D. Injection molding machine 100 according to the first modification example executes the flowchart indicating the processing procedure of the test cycle described in FIG. 7. This defines a zero-speed period and a servo-off period in a motor stop period.

Injection molding machine 100 according to the first modification example preferentially complies with a zero-speed period and a servo-off period defined on the basis of a test cycle. Meanwhile, when external force is detected, injection molding machine 100 switches the zero-speed control and the servo-off control. FIG. 11 is a flowchart illustrating a processing procedure of switching the zero-speed control and the servo-off control according to the first modification example.

The flowchart of FIG. 11 has a configuration in which step S300 is added to the flowchart of FIG. 10. When a motor rotation period is not entered (NO in step S200), control unit 41 determines whether or not a zero-speed period defined in S130 is entered (step S300). In other words, when a motor stop period is entered, control unit 41 determines on the basis of a test cycle which of a zero-speed period and a servo-off period is entered.

When a zero-speed period is entered (YES in step S300), control unit 41 performs the zero-speed control (step S203). After that, when external force is detected on the basis of a current sensor, control unit 41 switches the zero-speed control to the servo-off control. When a zero-speed period is not entered (NO in step S300), control unit 41 performs the servo-off control (step S208). After that, when external force is detected on the basis of a position sensor, control unit 41 switches the servo-off control to the zero-speed control.

In this way, injection molding machine 100 according to the first modification example automatically defines a zero-speed period and a servo-off period by using a test cycle. Even when unexpected external force brought about by an earthquake, an accident, a malfunctioning part included in injection molding machine 100, and the like occurs, injection molding machine 100 is capable of appropriately switching the zero-speed control and the servo-off control in real time.

Second Modification Example

In the second embodiment, the example has been described in which zero-speed periods and servo-off periods in all of the molding cycles executed in the injection molding process are defined on the basis of a test cycle. In a second modification example, an example will be described in which a zero-speed period and a servo-off period are updated for each cycle.

Injection molding machine 100 according to the second modification example includes a component similar to that of the third embodiment illustrated in FIG. 9. FIG. 12 is a flow illustrating a processing procedure of an injection molding process according to the second modification example. As in the second embodiment, a test cycle is executed in the second modification example before a molding cycle is begun.

The test cycle according to the second modification example is an experimental cycle having the same motor rotation period and motor stop period as those of the molding cycle. Control unit 41 executes a test cycle (step S400). As in the second embodiment, the test cycle according to the second modification example is a cycle in which the zero-speed control is performed in all of the motor stop periods.

Control unit 41 determines whether or not the test cycle is finished (step S410). When the test cycle is not finished (NO in step S410), control unit 41 repeats the processing of step S410. When the test cycle is finished (YES in step S410), control unit 41 acquires the values of the detection by current sensors 81A to 81D and the values of the detection by speed sensors 82A to 82D in the one most recent cycle (step S420).

When the flowchart of FIG. 12 is begun and step S420 is executed for the first time, the one most recent cycle is the test cycle executed in step S400. As described above, the servo-off control is not performed in the test cycle. In step S420, control unit 41 thus determines on the basis of the value of detection by a current sensor whether or not external force occurs.

Control unit 41 defines a zero-speed period and a servo-off period in the next cycle on the basis of the value of detection by a current sensor and the detection value of a position sensor (step S430). In other words, control unit 41 defines, as a zero-speed period, a specific period in which external force occurred and defines, as a servo-off period, a specific period in which no external force occurred.

Control unit 41 executes a new cycle in accordance with a zero-speed period and a servo-off period defined in step S430 (step S440). Control unit 41 determines whether or not the new cycle executed in S440 is finished (step S450). When the new cycle executed in S440 is not finished (NO in step S450), control unit 41 repeats step S450.

When the new cycle executed in S440 is finished (YES in step S450), control unit 41 determines whether or not the injection molding process is finished (step S460). When the injection molding process is not finished (NO in step S460), control unit 41 moves the processing to step S420.

Control unit 41 then defines a zero-speed period and a servo-off period in the next cycle in not the test cycle, but the new cycle executed in step S440 on the basis of the specific period in which external force occurred. When the injection molding process is finished (YES in step S460), control unit 41 finishes the processing.

In this way, injection molding machine 100 according to the second modification example updates a zero-speed period and a servo-off period for each cycle. This allows injection molding machine 100 according to the second modification example to define a zero-speed period and a servo-off period on the basis of the latest data.

[Supplement]

Those skilled in the art would understand that the plurality of exemplary embodiments described above is specific examples of the following aspects.

(Article 1) Injection molding machine 100 according to the present disclosure includes servomotor 80A, servo amplifier 50A that supplies the servomotor with power, and control device 40 that controls servo amplifier 50A to execute a molding cycle. Servo amplifier 50A includes switching element U1 and switching element V1. The molding cycle includes a motor rotation period in which servomotor 80A is rotated and a motor stop period in which servomotor 80A is not rotated. Servomotor 80A is configured to be rotatable by being controlled under the motor rotation control and stoppable by being controlled under the servo-off control or the zero-speed control. The motor rotation control is control to rotate servomotor 80A by performing control to turn on switching element U1 and switching element V1 in different phases. The zero-speed control is control to stop the rotation of servomotor 80A by performing control to turn on switching element U1 and switching element V1 in the same phase. The servo-off control is control to stop the rotation of servomotor 80A by performing control to turn off switching element U1 and switching element V1. Control device 40 executes the motor rotation control in the motor rotation period and executes the servo-off control or the zero-speed control in the motor stop period.

Injection molding machine 100 according to Article 1 prevents the rotation angle of a motor from unintentionally changing due to the reception of external force by the motor, reduces the consumption of power, and stops the motor.

(Article 2) Servomotor 80C according to Article 1 is a motor for opening and closing molds. Control device 40 executes the zero-speed control in the injection step of injecting an injection material to the molds and the pressure keeping step of keeping pressure to hold the injected injection material in the molds.

Injection molding machine 100 according to Article 2 makes it possible to keep the pressure that is applied to the injection material.

(Article 3) In Article 1, servomotor 80A is a motor for injecting an injection material to molds. Control device 40 executes the zero-speed control in the pressure keeping step of keeping pressure to hold the injected injection material in molds 17 and 18.

Injection molding machine 100 according to Article 3 makes it possible to keep the pressure that is applied to the injection material.

(Article 4) In any one of Articles 1 to 3, servomotor 80D different from servomotor 80C and servo amplifier 50D that supplies servomotor 80D with power are further included.

Injection molding machine 100 according to Article 4 makes it possible to execute the injection molding process by the plurality of servomotors.

(Article 5) In Article 4, servomotor 80C is a motor for opening and closing molds 17 and 18. Servomotor 80D is a motor for taking a molded article off a mold. Control device 40 executes the zero-speed control on servomotor 80C in a period in which servomotor 80D is being driven.

Injection molding machine 100 according to Article 5 makes it possible to prevent the driven ejection motor from unintentionally moving movable plate 14.

(Article 6) In Article 1, current sensor 81A that detects torque generated in servomotor 80A is further included.

Injection molding machine 100 according to Article 6 makes it possible to detect the generation of the torque by using the current sensor.

(Article 7) In Article 6, control device 40 executes a test cycle before executing the molding cycle. The test cycle including a motor rotation period in which servomotor 80A is rotated and a motor stop period in which servomotor 80A is not rotated. Control device 40 executes the zero-speed control in the motor stop period (S100). Control device 40 defines, on the basis of the detection value by the current sensor in the motor stop period, a period in which the servo-off control is executed in the motor rotation period and a period in which the zero-speed control is executed in the motor rotation period (S130).

Injection molding machine 100 according to Article 7 makes it possible to define a zero-speed period and a servo-off period on the basis of the test cycle.

(Article 8) In Article 6 or 7, when the current sensor detects no torque over a predetermined period (e.g., 100 ms) in a period in which the zero-speed control is being executed (NO in S207), control device 40 switches the zero-speed control to the servo-off control (S208).

Injection molding machine 100 according to Article 8 makes it possible to switch the zero-speed control to the servo-off control in real time when no external force is detected over the predetermined period.

(Article 9) In any one of Article 1 and Articles 6 to 8, injection molding machine 100 further includes a speed sensor that detects the rotation speed of servomotor 80A. When a motor rotating state is detected from a detection value by the speed sensor in a period in which the servo-off control is being executed (YES in S213), control device 40 switches the servo-off control to the zero-speed control (S203).

Injection molding machine 100 according to Article 9 makes it possible to switch the servo-off control to the zero-speed control in real time when external force is detected.

(Article 10) In Article 9, injection molding machine 100 further includes an angle sensor that detects the rotation angle of servomotor 80A and storage device 44 that stores a result of the detection by the angle sensor. Control device 40 causes storage device 44 to store the detection value by the angle sensor at the time of starting the servo-off control (S209). When a motor rotating state is detected from the detection value by the speed sensor (YES in S213), control device 40 rotates servomotor 80A to a rotation angle indicated by the detection value by the angle sensor stored in storage device 44 (S214).

Injection molding machine 100 according to Article 10 makes it possible to return the rotation angle of a motor rotated by external force to a rotation angle at which the external force has not yet occurred.

(Article 11) In any one of Article 1 and Articles 6 to 8, sensor 84A is further included that detects the rotation speed and the rotation angle of servomotor 80A. When a motor rotating state is detected from a detection value by sensor 84A in a period in which second control is being executed, control device 40 switches the second control to third control and causes storage device 44 to store the detection value by sensor 84A at the time of starting the second control. When a motor rotating state is detected from the detection value by sensor 84A, control device 40 rotates servomotor 80A to a rotation angle indicated by the detection value by sensor 84A stored in storage device 44.

Injection molding machine 100 according to Article 11 makes it possible to switch the servo-off control to the zero-speed control in real time when external force is detected by using the position sensor and return the rotation angle of the motor rotated by the external force to the rotation angle at which the external force has not yet occurred.

Although the embodiments of the present invention have been described, it should be understood that the embodiments disclosed herein are examples in all respects, but should not to be taken by way of limitation. The scope of the present invention is defined by the claims. The scope of the present invention is intended to include all modifications within the meaning and the scope equivalent to the claims.

What is claimed is:

1. An injection molding machine comprising:
a first servomotor;
a first servo amplifier that supplies the first servomotor with power; and
a control device that controls the first servo amplifier to execute a molding cycle, wherein
the first servo amplifier includes a first switching element and a second switching element,
the molding cycle includes a first period in which the first servomotor is rotated and a second period in which the first servomotor is not rotated,
the first servomotor is rotatable by being controlled under first control and stoppable by being controlled under second control or third control,
the first control is control to rotate the first servomotor by performing control to turn on the first switching element and the second switching element in different phases,
the third control is control to stop rotation of the first servomotor by performing control to turn on the first switching element and the second switching element in a same phase,
the second control is control to stop the rotation of the first servomotor by performing control to turn off the first switching element and the second switching element, and
the control device executes the first control in the first period, and executes the second control or the third control in the second period.

2. The injection molding machine according to claim 1, wherein
the first servomotor is a motor for opening and closing molds, and
the control device executes the third control while injecting an injection material to the molds and keeping pressure to hold the injected injection material in the molds.

3. The injection molding machine according to claim 1, wherein
the first servomotor is a motor for injecting an injection material to molds, and
the control device executes the third control while keeping pressure to hold the injected injection material in the molds.

4. The injection molding machine according to claim 1, further comprising:
a second servomotor different from the first servomotor; and
a second servo amplifier that supplies the second servomotor with power.

5. The injection molding machine according to claim 4, wherein
the first servomotor is a motor for opening and closing molds,
the second servomotor is a motor for taking a molded article off a mold, and
the control device executes the third control on the first servomotor in a period in which the second servomotor is being driven.

6. The injection molding machine according to claim 1, further comprising a torque sensor that detects torque generated in the first servomotor.

7. The injection molding machine according to claim 6, wherein the control device
executes a test cycle before executing the molding cycle, the test cycle including a third period in which the first servomotor is rotated and a fourth period in which the first servomotor is not rotated,
executes the third control in the fourth period, and
defines, on a basis of a detection value by the torque sensor in the fourth period, a period in which the second control is executed in the second period and a period in which the third control is executed in the second period.

8. The injection molding machine according to claim 6, wherein the control device switches the third control to the second control when the torque sensor detects no torque over a predetermined period in a period in which the third control is being executed.

9. The injection molding machine according to claim 1, further comprising a speed sensor that detects rotation speed of the first servomotor, wherein
the control device switches the second control to the third control when a motor rotating state is detected from a detection value by the speed sensor in a period in which the second control is being executed.

10. The injection molding machine according to claim 9, further comprising:
an angle sensor that detects a rotation angle of the first servomotor; and
a storage device that stores a result of detection by the angle sensor, wherein
the control device causes the storage device to store a detection value by the angle sensor at time of starting the second control, and rotates the first servomotor to a rotation angle indicated by the detection value by the angle sensor stored in the storage device when a motor rotating state is detected from the detection value by the speed sensor.

11. The injection molding machine according to claim 1, further comprising:

a position sensor that detects rotation speed and a rotation angle of the first servomotor; and a storage device that stores a result of detection by the position sensor, wherein the control device switches the second control to the third control when a motor rotating state is detected from a detection value by the position sensor in a period in which the second control is being executed, causes the storage device to store the detection value by the position sensor at time of starting the second control, and rotates the first servomotor to a rotation angle indicated by the detection value by the position sensor stored in the storage device when a motor rotating state is detected from the detection value by the position sensor.

* * * * *